United States Patent [19]

Mannuss et al.

[11] Patent Number: 5,208,574
[45] Date of Patent: May 4, 1993

[54] TEMPERATURE SENSOR

[75] Inventors: Siegfried Mannuss, Sternenfels;
Heinz Petri, Bretten, both of Fed.
Rep. of Germany

[73] Assignee: **E.G.O. Elektro-Gerate Blanc u.
Fischer,** Fed. Rep. of Germany

[21] Appl. No.: 757,721

[22] Filed: Sep. 11, 1991

[30] Foreign Application Priority Data

Sep. 15, 1990 [DE] Fed. Rep. of Germany ....... 4029351

[51] Int. Cl.$^5$ ..................... H01H 37/48; H01H 37/46
[52] U.S. Cl. .................. 337/394; 219/449;
337/382; 337/393
[58] Field of Search ............. 338/382, 393, 394;
219/449, 450

[56] References Cited

U.S. PATENT DOCUMENTS 3,004,123 10/1961 Cannon .
3,774,136 11/1973 Zelenka .............................. 337/382

FOREIGN PATENT DOCUMENTS 1927147 12/1970 Fed. Rep. of Germany .
6606761 12/1970 Fed. Rep. of Germany .
7218262 10/1972 Fed. Rep. of Germany .
7317639 10/1973 Fed. Rep. of Germany .
2806193 8/1979 Fed. Rep. of Germany .
3236306 4/1984 Fed. Rep. of Germany .
3508585 9/1985 Fed. Rep. of Germany .
3540414 5/1987 Fed. Rep. of Germany .
3705260 9/1988 Fed. Rep. of Germany .
3705261 9/1988 Fed. Rep. of Germany .

*Primary Examiner*—Harold Broome
*Attorney, Agent, or Firm*—Quarles & Brady

[57] ABSTRACT

A rod sensor (1) has in the vicinity of a sliding guide (17) of an outer tube (2) a bolt-like, smooth abutment (4) for an inner rod (3), which prior to the insertion of the inner rod (3) and prior to the constructional joining of the temperature sensor (1) to a switch base (10) is adjusted with a measuring screw (36) against the tension of a spring (39) to a predetermined adjusting amount (30) and is firmly connected to the outer tube (2) by a welding mechanism (40) or the like. Thus, a very accurate adjustment is obtained in the case of a simple construction.

36 Claims, 2 Drawing Sheets

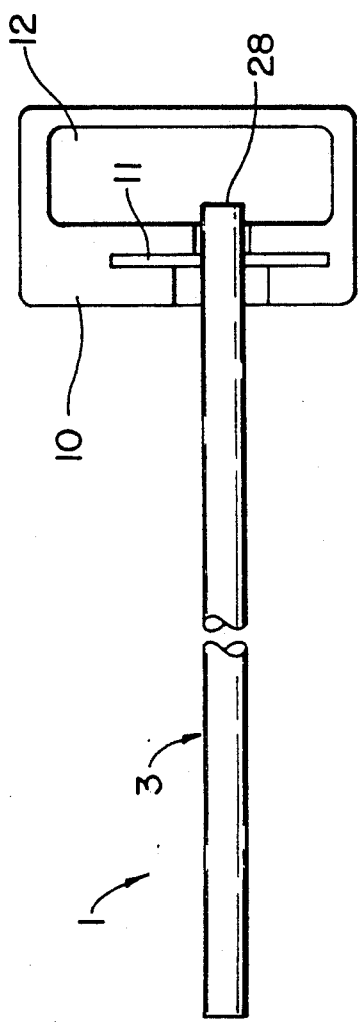
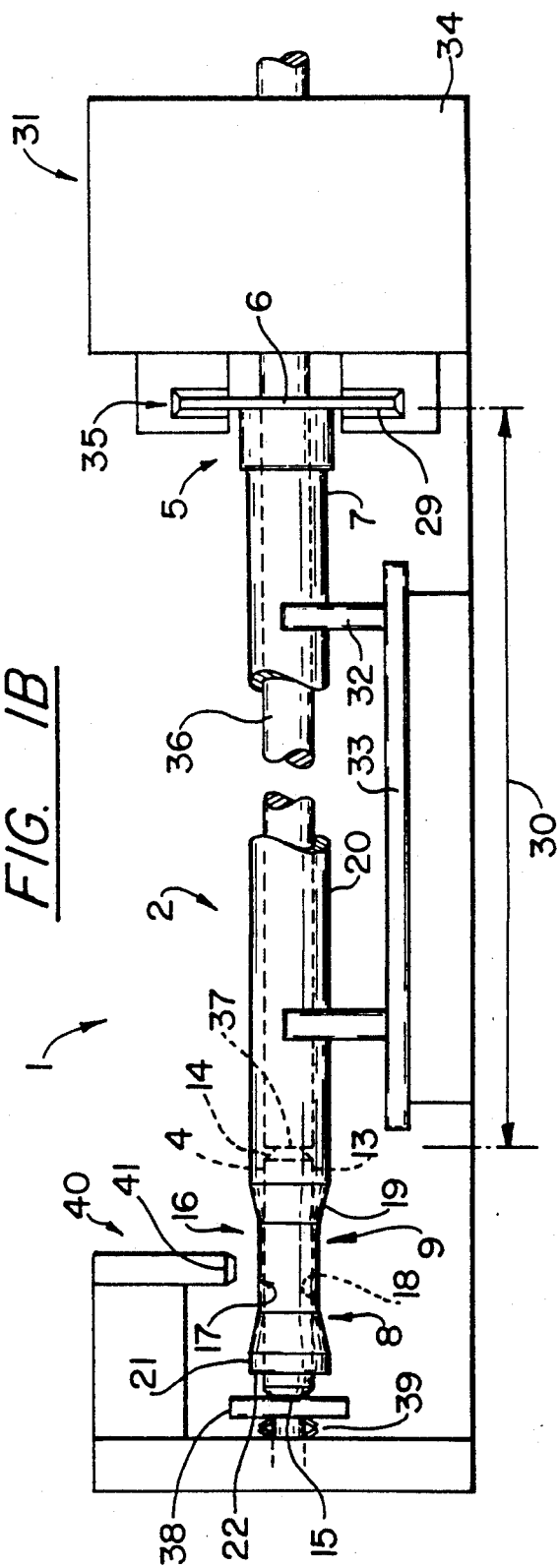
FIG. 1A
FIG. 1B

TEMPERATURE SENSOR

DESCRIPTION

BACKGROUND OF THE INVENTION

The invention relates to a temperature sensor, which has an at least partly rod-shaped construction, in which appropriately two or more components have different thermal expansion coefficients, so that a sensing value can be derived from the relative expansion. The components are supported against one another by means of one or more abutments.

Temperature sensors of this type can, in the form of rod sensors, be fixed to one or more switch bases or casings and project freely to the outside. One or more inner rods made from an insulating material, such as steatite, or a metal are placed in one or more outer tubes made from metal or insulating material, such as quartz glass. These two or more rod units are supported against one another by means of an abutment at the rod sensor end remote from the switch base, while the end of a rod part located at the switch base is used for switch operation and the associated end of the other rod part for fixing with respect to the switch base. Such temperature switches are mainly used as thermal cut-outs and/or signal switches or the like on heating appliances, such as electric hotpoints, etc. For adjusting the temperature sensor, the abutment can be formed by a screwbolt that is adjusted in the direction of the operating movement of the temperature sensor and is then fixed optionally with a varnish coating. The torque needed for adjustment purposes can vary very widely as a function of the thread quality and thread tolerances. In addition, the thread quality of the internal thread provided on the outer tube can only be fixed within very large tolerances due to the difficultly caused by deformable tube material, and there is an influence caused by wear to the threading tool, which is very considerable and takes place rapidly. The poor thread quality in particular affects the thread flanks and tolerance divergences of the minor diameter of the thread.

SUMMARY OF THE INVENTION

An object of the present invention is to provide a temperature sensor of the aforementioned type, which avoids the disadvantages of known constructions and which in particular ensures a simplified manufacture and possibly a simplified adjustment.

This object is achieved by several measures considered singly or in combination. For example, the abutment can have substantially smooth outer faces, i.e. optionally at least in the vicinity of the connection to the associated rod part can be thread-free, so that the disadvantages associated with the manufacture and function of the thread are excluded. However, the abutment can also be connected to the associated rod part substantially independently of the construction of its faces by an engagement differing from a rotary engagement, e.g. by means of a sliding engagement.

In the case of an adjustment of the abutment already connected to the associated rod part, then said abutment is initially displaceable in the direction of the operating movement of the temperature sensor and optionally also freely rotatably mounted on said rod part. Only on reaching the adjustment position is the abutment fixed with respect to the rod part against the operating forces which occur and consequently locked in the sliding direction with respect to its free mobility. This locking effect can be provided by a non-releasable connection, in that release is only possible by destroying at least one component.

A one-piece construction of the abutment with the associated rod part is less preferred than a construction in which the abutment is formed by a separate part, because then its mobility can be formed by a simple sliding support with substantially profile-free, smooth sliding faces instead of by deformable portions. Unlike a threaded connection, in which the thread flanks only partly engage on one another, an engagement can be provided which passes uninterruptedly over the length and/or the circumference of a fastening interruptedly over the length and/or the circumference of a fastening portion of the abutment. Consequently, said fastening portion can engage with radial clearance-free sliding seating in the associated rod part, so that the adjustment position cannot be falsified by radial displacement.

For the rigid or adhesive connection of the abutment to the associated rod part, at least partly the fastening portion and/or an abutment portion spaced therefrom can be provided. For example, the abutment and/or the associated rod part can have a circular projection or several juxtaposed individual projections with which the abutment and rod part are supported against one another or centered against one another in an otherwise contact-free area. Also in this area the substantially non-releasable connection can be provided by welding, soldering, barb-like claw engagement, cementing, etc., and a combination of these fixing types are possible.

The abutment can have substantially constant cross-sections over its length, so that it can be manufactured without further machining merely by cutting from a bright drawn bar stock. In particular, it requires no milling, such as is required for producing an adjusting screw slot. Despite a rounded or chamfered construction, the end faces of the abutment can remain free from profiling traversing said end face. The rod part to be supported on the abutment solely by the engagement of a supporting face can be subdivided in at least one direction two or more times, this more particularly occurring in its longitudinal direction and can be made from the same material or bar stock as the abutment. The abutment can be directly formed by said rod part with a longitudinal portion.

If there is a melting connection, e.g. a welded connection, between the abutment and the associated rod part, then the corresponding connecting or joining surfaces are made from a suitable material, e.g. metal. To make it unnecessary to provide separate connecting parts, such as is the case with a ceramic rod material, the rod part connected to the abutment, the abutment and/or the rod part supported thereon can be substantially completely made from a thermally meltable material. The problem of the invention can be solved in that the two rod parts are at least partly made from metal with different expansion coefficients.

The invention also proposes a method for adjusting a temperature sensor, which is at least partly rod-like and is in particular constructed in the manner described hereinbefore. The adjustment does not take place by determining the switching point of the switch such as a snap switch, to be operated by the temperature sensor, but rather on the basis of a direct measurement of the relative position between the abutment and the associated rod part or between the two rod part units. Thus, the temperature sensor can be preassembled in completely adjusted form prior to assembly with the switch base and optionally also with the rod part to be supported on the abutment.

Appropriately, prior to the fitting of the rod part to be supported, the end of the measuring screw of an adjusting machine engages on one end of the part abutment, while a counterpressure member engages under compressive loading on the other end, the position of the abutment surface for supporting the corresponding rod part is determined and by retracting or advancing the measuring screw is set to the desired adjustment position and then the abutment is fixed in this position. The reference surface for the measurement is appropriately a surface of the rod part, which supports the same in clearance-free manner against the operating forces of the temperature sensor following installation on the switch base.

BRIEF DESCRIPTION OF THE DRAWINGS

These and other features can be gathered from the claims, description and drawings, the individual features being realisable either singly or in the form of subcombinations in an embodiment of the invention and in other fields and can represent advantageous, independently protectable constructions for which protection is hereby claimed. The invention is described hereinafter relative to embodiments and the attached drawings, wherein show:

FIG. 1A An inner core of a temperature sensor mounted to a sensor base

FIG. 1B The outer shell and abutment of a temperature sensor during adjustment.

DETAILED DESCRIPTION OF THE PREFERRED EMBODIMENTS

Figure 2:
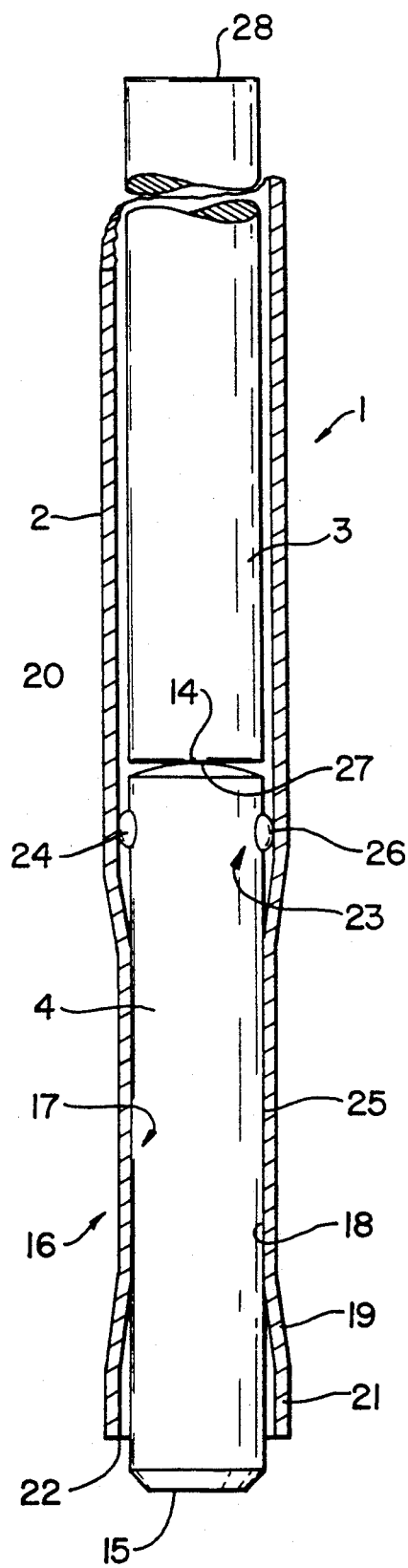
FIG. 2 A detail of the temperature sensor in axial section.

The temperature sensor 1 has a tubular first rod part 2 with a diameter of max approximately 5 mm, a second rod part 3 to be inserted in substantially contact-free manner therein and an abutment 4 to be inserted and fixed in the rod part 2. All the components are each made in one piece from metal, such as steel. This also applies to a mounting flange 6 with a flange plate projecting radially from the outer circumference of the rod part 2 and which is engaged on and fixedly positionally secured on an inner end 7 of the rod part 2. In the vicinity of the other, outer end 8 is provided the abutment 4, which is immovably fixed by a fastening 9 on the rod part 2, in such a way that, without destruction and also not by overcoming an inhibiting force, cannot be moved in the direction in which the rod part 3 exerts operating forces on the abutment 4.

The temperature sensor 1 is intended for substantially positionally rigid fixing to a switch base 10, e.g. a manually settable temperature regulator. The base 10 has a slot-like receptacle 11 for the mounting flange 6 and adjacent thereto a switch chamber 12 for receiving at least one snap switch or the like, which is to be operated by the rod part 3.

The abutment 4 is formed by a bolt with a smooth outer face 13, which is cylindrical over most of its length, which is rounded in spherical cupshaped manner at an end face 14 and whose other, planar end face 15 is circumferentially provided with a chamfer.

In the vicinity of the outer end 8, the substantially cylindrical rod part 2 forms a cylindrical fastening portion 16 whose external and/or internal diameter is reduced roughly by twice its wall thickness and which is formed by the deformation of the associated area of one portion of a longer pipe section and which can therefore have a modified or denser structure than the remaining areas of the pipe portion. The cylindrical inner face 18 of the fastening portion 16, which has an uninterrupted smooth surface over its length and circumference forms a radial clearance-free sliding guide 17 for the slidable guidance of the outer face 13 of the abutment 4, so that the latter can be linearly displaced in rotation-free manner with respect to the rod part 2.

The length of the sliding guide 17 is approximately 2½ times greater than its diameter and at each end passes via an acute-angled, truncated cone-shaped transition portion 19 into the following, further portion of the rod part 2. The longer of said connecting portions forms the main portion 20 for receiving the rod part 3, while the other portion forms a cylindrical end portion 21, whose length is smaller than its radius. This end portion 21 forms the outer end face 22 of the rod part 2 over which the abutment 4 can project outwards with the end face 15 by an amount which is smaller than its diameter.

Adjacent to the particular end of the sliding guide 17, the abutment face 14 is located in a substantially contact-free projecting manner within the rod part 2, namely within the transition portions 19 of the main portion 20 and the end portion 21. At a small axial distance from the transition portion 19 associated with the main portion 20, the abutment 4 has a spacer 23 formed from two, three or more studs 24 substantially uniformly distributed over its circumference, which engage in a punctiform and substantially clearance-free manner on the inner face of the main portion 20. If these studs 24 are produced prior to the insertion of the abutment 4, they form the sole interruption of the smooth outer face 13. However, they can also be produced after insertion, e.g. in the manner of welding spots. The abutment 4 is connected by at least one connection 25 or 26 in much the same way as with a one-part connection to the rod part 2. If a single such connection is provided, then it is appropriately either in the vicinity of the sliding guide 17 or in the vicinity of the spacer 23, or in the vicinity of the main portion 22 and spaced from the outer end of the rod part 2.

The rod part 3 is formed by an uninterrupted, smooth-surface rod portion with planar, and optionally chamfer-free, end faces 27, 28, whose one end face 27 is intended for equiaxial pressure engagement on the end face 14 of the abutment 4 and whose other end face 28 is intended to engage on a pressure point of the not shown snap switch, so that the rod part 3 is held in each position in axial clearance-free manner with a pretension exerted by the snap switch.

The position of the pressure point of the snap switch is precisely predetermined with respect to the receptacle 11 by corresponding fastenings of the base 10 into which the snap switch is appropriately inserted from the same side of the base 10 as the temperature sensor 1 is inserted in the receptacle 11. The flange face 29 by which the mounting flange 6 is then supported on the base 10 against the operating forces, forms the reference face for the adjusted position of the end face 14 of the abutment 4. Thus, with respect to the flange face 29, the abutment 4 must maintain an adjusting amount 30.

For the adjustment of the abutment 4, an adjusting device 31 is provided, which is provided with a mounting support 32, e.g. in the form of a pedestal for the rod part 2. Successive mounting supports 32 can be provided on a conveyor 33, which successively supplies the rod parts 2 to the adjusting station according to FIG. 1, whereas in a preceding station, an abutment 4 is inserted in the sliding guide 17. After leaving the adjusting station, the rod part 3 can be inserted until it engages on the adjusted abutment 4 in a further station and then the thus preassembled temperature sensor 1 can be inserted in a following station in the base 10 and at right angles to its longitudinal direction.

The adjusting device 31 has a bracket 34 with a receptable 35 for the flange plate 6. The receptacle 35 is e.g. provided with through, facing reception slots in the conveying direction and their dimensions correspond to the receptacle 11 of the base 10, so that the flange plate 6 is introduced from one side and following adjustment can be moved out again from the opposite side. In order to be able to receive different flange plate shapes, the receptable 35 is adjustable or replaceable.

A measuring screw 36 is axially adjustably mounted by means of a control mechanism with a servodrive in the bracket 34 and roughly have the same cross-sections as the rod part 3 or slightly larger cross-sections than the latter, so that they can be slidingly guided on the inner circumference of the main portion 20. This measuring screw 36 is introduced through the passage opening of the flange 6 into the main portion 20 until its associated end or pressure face 37 engages on the end face 14. The pressure face 37 is planar and consequently corresponds to the end face 27. On inserting the rod part 2 into the adjusting station, the projecting end face 15 of the abutment 4 runs on to the counterpressure face of an axially resiliently displaceable counter pressure member 38, which loads the abutment 4 under the tension of a spring 39 in the direction of the measuring screw 36. Thus, the measuring screw 36 can move the abutment 4 against the tension of the spring 39 until the adjusting amount 30 is reached.

In the vicinity of the connection 25 or 26 to be produced, the adjusting station has a welding mechanism 40 with a laser welding head 41 or the like, which is so controlled by means of the control mechanism that on reaching the adjusting amount 30 it produces the connection, while the abutment 4 is secured in its adjustment position by the measuring screw 36 and the counterpressure member 38.

Figure 3:
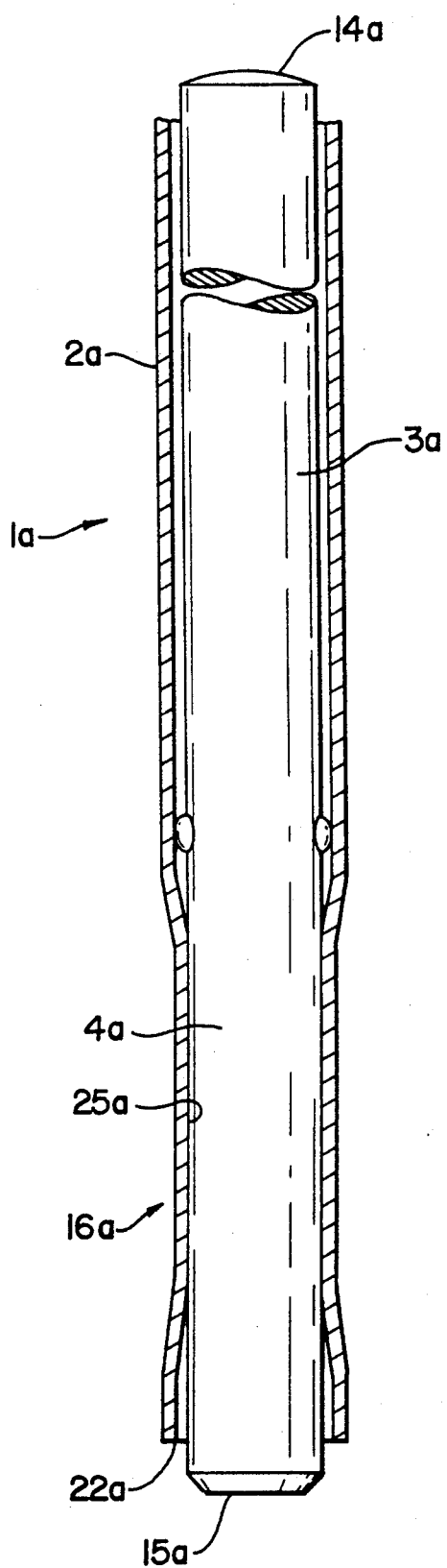
FIG. 3 Another embodiment in a view corresponding to FIG. 2.

In the case of the embodiment of FIGS. 1 and 2, it is a temperature sensor with a compression-loaded rod part 3. The temperature sensor 1a according to FIG. 3 is suitable both for compression-loaded and tensile-loaded functional arrangement. In this case the abutment 4a is connected firmly to the rod part 3a in the push and pull direction and is in fact constructed in one piece therewith, both parts or portions having the same cross-sections. Whereas in the embodiment according to FIGS. 1 and 2, the abutment 4 can be made from a material with roughly the same expansion coefficients as the rod part 2 and from which differs the expansion coefficient of the rod part 3, in the embodiment according to FIG. 3 the abutment 4a has an expansion coefficient differing from that of the rod part 2a. In the embodiment according to FIG. 3 the adjusting amount is obtained between the corresponding flange face and the end face of the rod part constructed in one piece with the abutment 4a.

We claim:
1. A temperature sensor comprising:
at least one sensing rod, having a first rod unit (2) radially surrounding a second rod unit (3) and an abutment (4) radially surrounded by said first rod unit (2) for operationally supporting said second rod unit (3) against said first rod unit (2), said abutment having circumferential engagement faces for bearingly engaging said first rod unit (2) to prevent axial motion of said abutment relative to said first rod unit, wherein said engagement faces of said abutment have substantially smooth faces.

2. The temperature sensor according to claim 1, wherein said engagement faces are threadable but are at least partly free of any thread.

3. The temperature sensor according to claim 1, wherein said abutment (4) is connected to said first rod unit (2) by a nonrotary engagement and is arranged and fixed on a linear guide means substantially axially parallel to said first rod unit (2).

4. The temperature sensor according to claim 1, further comprising an adjusting means and wherein said abutment (4) is positioned and connected by means of said adjusting means to an end (8) of said first rod unit (2).

5. The temperature sensor according to claim 1, wherein said one first rod unit (2) defines at least one sliding guide (17) having at least two sliding members slidingly interconnected in a first state of said sensing rod, and in a second state of said sensing rod, said slide members being interconnected in at least one of modes defined by a motion-free rigid interconnection and an operationally non-detachable interconnection of said circumferential engagement faces.

6. The temperature sensor according to claim 1, wherein said abutment (4) is formed separate from said first rod unit (2).

7. The temperature sensor according to claim 1, wherein said abutment (4) is a circumferentially substantially smooth faced bolt and has substantially constant cross-sections over an entire length extension of said bolt.

8. The temperature sensor according to claim 1, wherein said abutment (4) has a fastening portion spaced from one of its ends (14, 15); in the vicinity of said fastening portion, said one abutment (4) engaging substantially uninterruptedly the first rod unit (2) in at least one of directions defined by a longitudinal and a circumferential direction.

9. The temperature sensor according to claim 1, wherein said abutment (4) has a centering member and a spacing engagement member (23) projecting towards a counter face of said first rod unit (2), said spacing member (23) being located in the vicinity of a portion of said abutment (4) radially spaced from said first rod unit (2).

10. The temperature sensor according to claim 9, wherein said abutment (4) has an inner end (14) connected to said second rod unit (3), said spacing engagement member (23) being located closely adjacent to said inner end (14).

11. The temperature sensor according to claim 9, wherein said spacing engagement member provides a number of protruding knobs (24) distributed over a circumference of said abutment.

12. The temperature sensor according to claim 9, wherein said spacing engagement member (23) is connected directly to said first rod unit (2) by a connectingly solidified connecting medium (26).

13. The temperature sensor according to claim 1, wherein in the vicinity of a circumference of an end of said abutment (4) said abutment (4) is free from contact with said first rod unit (2).

14. The temperature sensor according to claim 1, wherein between and spaced from end portions of said abutment, said abutment (4) has a fastening portion (16) providing a length extension at least two times greater than an external maximum cross-sectional width extension of said fastening portion.

15. The temperature sensor according to claim 1, wherein said abutment (4) has an end portion for operationally engaging said second rod unit (3); said end portion having substantially the same external cross-sections as said second rod unit (3).

16. The temperature sensor according to claim 15, wherein said end portion has a convexingly curved end face (14) for engaging said second rod unit (3).

17. The temperature sensor according to claim 1, wherein said abutment (4) is formed separate from said second rod unit (3) and has an at least five times greater length extension than its external maximum cross-sectional width extension.

18. The temperature sensor according to claim 1, wherein said abutment (4) projects past an end of said first rod unit (2).

19. The temperature sensor according to claim 1, wherein said abutment (4a) is constructed in one part with said second rod unit (3a).

20. The temperature sensor according to claim 1, wherein said second rod unit (3a) includes said abutment and extends in substantially one part from said abutment (4a) to an operating end.

21. The temperature sensor according to claim 1, wherein said abutment (4) at least partly comprises a liquefyable material.

22. The temperature sensor according to claim 1, wherein said abutment is formed by a cut off longitudinal section of a bar stock only machined at end faces.

23. The temperature sensor according to claim 1, wherein said abutment (4) is connected to said first rod unit (2) substantially only adhesively by at least one welded joint free of added welding material.

24. The temperature sensor according to claim 1, wherein for receiving said abutment (4), said first rod unit (2) has a narrowed fastening section (16).

25. The temperature sensor according to claim 24, wherein said fastening section (16) adjoins via an acute-angled, concial cone-shaped transition portion (19) into a widended portion of said first rod unit.

26. The temperature sensor according to claim 24, wherein said fastening section (16) adjoins an outer end portion (21) of said first rod unit (2), said outward portion being shorter than a length extension and an external width extension of said fastening section (16).

27. The temperature sensor according to claim 1, wherein for receiving said abutment (14), said first rod unit (2) has a substantially smooth and sealingly closed longitudinal guide, free of thread formations.

28. The temperature sensor according to claim 1, wherein said abutment (4) is fixed with respect to said first rod unit (2) at a predetermined adjusted position reached by directly measuring positions of said abutment (4) with respect to said first rod unit (2) and setting said abutment in said predetermined adjusted position as a function of said measured positions, whereafter said abutment (4) is fixed to said first rod unit (2) in said adjusted position.

29. The sensor according to claim 28, wherein adjustment of said abutment (4) is performed prior to inserting said second rod unit (3) and prior to assembling connection of the temperature sensor with a switch base (10).

30. The sensor according to claim 28, wherein during adjustment motion said first rod unit (2) is received on a fastening end (5) provided to support against an operating tension when assembled with a sensor base (10), said abutment (4) being adjusted substantially linearly by applying compressive loadings on opposite ends (14, 15) of said abutment.

31. The sensor according to claim 28, further comprising a measuring member and a sensor base, and wherein the position of said abutment (4) is measured with a measuring member (36) as a distance between a fastening end (5) of said first rod unit (2) for fastening on a sensor base (10) and an associated end face (14) of said abutment (4), said measuring member being contacted against said end face.

32. The sensor according to claim 28, further comprising a mounting flange (6) and wherein said adjusted position is predetermined as a distance emanating from said mounting flange (6) of said first rod unit (2), said mounting flange (6) being used as a measuring base outside an outer circumference of said first rod unit (2).

33. the sensor according to claim 28, further comprising a measuring member (36) for measuring the position of the abutment (4) and for setting said abutment (4) in the adjusted position, whereby said measuring member (36) is applied by a pressure face (37) against said abutment (4) and is then moved with said at least one abutment 36) counter to a spring tension at an opposite end of said abutment, whereby said measuring member (36) is supportingly guided on said at least one first rod unit (2).

34. The sensor according to claim 28, wherein prior to fixing said abutment (14) to said first rod unit (2), said abutment (4) is secured in the adjusted position by pressure loading on its opposite end faces (14, 15) at least until the fixing has begun.

35. The sensor according to claim 28, further comprising a setting and measuring member (36) and wherein at least until fixing of said abutment (4) to said first rod unit (2) has begun, said abutment (4) is positionally secured at one end with said setting and measuring member (36) for measuring the positions.

36. The sensor according to claim 28, wherein said abutment (4) is fixed to said first rod unit (2) by welding operation issued from a side to said first rod unit (2) remote from said abutment (4).

* * * * *